(12) United States Patent
Kang et al.

(10) Patent No.: US 9,107,256 B2
(45) Date of Patent: Aug. 11, 2015

(54) LIGHT EMITTING DIODE LIGHTING APPARATUS

(71) Applicant: Samsung Electronics Co., Ltd., Gyeonggi-do (KR)

(72) Inventors: Dae-sung Kang, Gyeonggi-do (KR); Yun-whan Na, Gyeonggi-do (KR); Yong-keun Jee, Gyeonggi-do (KR); Seok-kyu Kim, Gyeonggi-do (KR); Ki-hong Moon, Gyeonggi-do (KR); Chung-hee Lee, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 337 days.

(21) Appl. No.: 13/625,446

(22) Filed: Sep. 24, 2012

(65) Prior Publication Data

US 2013/0076255 A1     Mar. 28, 2013

(30) Foreign Application Priority Data

Sep. 22, 2011   (KR) ........................ 10-2011-0095817

(51) Int. Cl.
  *H05B 41/36*  (2006.01)
  *H05B 33/08*  (2006.01)
  *H02H 9/00*   (2006.01)

(52) U.S. Cl.
  CPC ........ *H05B 33/0812* (2013.01); *H05B 33/0845* (2013.01); *H02H 9/001* (2013.01); *Y02B 20/343* (2013.01)

(58) Field of Classification Search
  USPC .......... 315/185 R, 192, 193, 200 R, 201, 205, 315/294, 283, 291, 297, 300, 307, 313, 362, 315/352
  See application file for complete search history.

(56) References Cited

U.S. PATENT DOCUMENTS

| 4,787,022 | A | * | 11/1988 | Maeba et al. ................... 363/52 |
| 6,181,084 | B1 | * | 1/2001 | Lau .............................. 315/291 |
| 6,359,392 | B1 | | 3/2002 | He |
| 6,680,603 | B1 | * | 1/2004 | Klaus-Manfred ............. 323/266 |
| 7,710,049 | B2 | | 5/2010 | Wang et al. |
| 2006/0238465 | A1 | | 10/2006 | Kurumisawa |
| 2010/0289418 | A1 | * | 11/2010 | Langovsky ................... 315/210 |

FOREIGN PATENT DOCUMENTS

| JP | 08-186979 | 7/1996 |
| KR | 97-53034 | 9/1997 |
| KR | 1020010082810 A | 8/2001 |
| KR | 1020100000588 A | 1/2010 |
| KR | 1020100012599 A | 2/2010 |

* cited by examiner

*Primary Examiner* — Douglas W Owens
*Assistant Examiner* — Jianzi Chen
(74) *Attorney, Agent, or Firm* — McDermott Will & Emery LLP

(57) ABSTRACT

A light emitting diode (LED) lighting apparatus boosts alternating current (AC) power output from a ballast, rectifies the boosted AC power to direct current (DC) power, blocks generation of an inrush current while the boosted AC power is rectified, and controls an operation of an LED by using the DC power.

6 Claims, 4 Drawing Sheets

LIGHT EMITTING DIODE LIGHTING APPARATUS

CROSS-REFERENCE TO RELATED PATENT APPLICATION

This application claims the benefit of priority to Korean Patent Application No. 10-2011-0095817, filed on Sep. 22, 2011, in the Korean Intellectual Property Office, the disclosure of which is incorporated herein in its entirety by reference.

BACKGROUND OF THE INVENTION

1. Field of the Invention

The present disclosure relates to a light emitting diode (LED) lighting apparatus.

2. Description of the Related Art

A light emitting diode has been used as a low power light source, such as an indicator. As light efficiency of the LED has been improved, the LED becomes to have a wide range of applications. Also, unlike other light sources, the LED is an environmental friendly light source that does not include mercury, and has gained attentions as a next-generation light source used for a backlight of a mobile terminal, a backlight of a liquid crystal display (LCD) television (TV), lamps of cars, general lighting, or the like. Accordingly, an incandescent light having a low power efficiency characteristic and a fluorescent light generating an environmental waste, such as mercury, which have been used as main light sources for lighting for the last 100 years, are being replaced by LED lamps.

However, the LED lamp has shortcomings, such as a short life due to a short life span of a circuit device coupled to an LED in the LED lamp. This makes it difficult for the LED lamp to substitute for an incandescent light or a halogen lamp currently on the market.

SUMMARY OF THE INVENTION

The present disclosure provides a light emitting diode (LED) lighting apparatus.

Additional aspects will be set forth in part in the description which follows and, in part, will be apparent from the description, or may be learned by practice of the presented embodiments.

Embodiments are directed to a light emitting diode (LED) lighting apparatus for driving an LED by supplying alternating current (AC) power through a ballast. The LED lighting apparatus includes a boosting unit for boosting and outputting the AC power output from the ballast; a rectifier for rectifying the boosted AC power to direct current (DC) power; an inrush current breaker for blocking generation of an inrush current while the rectifier rectifies the boosted AC power; and an LED driver for controlling operations of the LED by using the DC power supplied while the inrush current is being blocked.

The boosting unit may include an inductor and a capacitor coupled to the ballast, of which resonance enables the boosted AC power having a triangular waveform to be outputted.

Capacitance and a type of a capacitor of the rectifier may be determined based on the boosted AC power.

The inrush current breaker may block the inrush current by using a switch of the inrush current breaker, which is switched on and off according to an amount of charge in a capacitor of the inrush current breaker.

The inrush current breaker may be a discrete circuit between a rear end of a bridge rectifier of the rectifier and a front end of the LED driver.

Embodiments are also directed to a light emitting diode (LED) lighting apparatus for driving an LED by using supplied alternating current (AC) power. The LED lighting apparatus includes a ballast for outputting the supplied AC power to AC power of a predetermined voltage to stabilize driving of the LED lighting apparatus; a boosting unit for boosting and outputting the AC power output from the ballast; a rectifier for rectifying the boosted AC power to direct current (DC) power; and an LED driver for controlling an operation of the LED by using the rectified DC power.

The boosting unit may include an inductor and a capacitor coupled to the ballast, of which resonance enables the boosted AC power having a triangular waveform to be outputted.

Embodiments are also directed to a light emitting diode (LED) lighting apparatus for driving an LED by supplying alternating current (AC) power through a ballast. The LED lighting apparatus includes a rectifier for rectifying the AC power supplied through the ballast to direct current (DC) power; an inrush current breaker for blocking generation of an inrush current while the AC power is rectified; and an LED driver for controlling an operation of the LED by using the DC power supplied while the inrush current is blocked.

The inrush current breaker may block the inrush current by using a switch of the inrush current breaker, which is switched on and off according to a charged amount of a capacitor of the inrush current breaker.

The inrush current breaker may be a discrete circuit between a rear end of a bridge rectifier of the rectifier and a front end of the LED driver.

Embodiments are also directed to a method for driving a light emitting diode (LED) by supplying alternating current (AC) power through a ballast. The method includes boosting the supplied AC power using resonance of an inductor and a capacitor coupled to the ballast to output boosted AC power; rectifying the boosted AC power to direct current (DC) power; and controlling an operation of the LED by using the rectified DC power.

The method may include blocking generation of an inrush current while the AC power is rectified.

A waveform of the boosted AC power may have a triangular shape.

Embodiments are also directed to a method of driving a light emitting diode (LED) lighting apparatus by supplying commercial alternating current (AC) power through a ballast. The method includes boosting the AC power output from the ballast; rectifying the boosted AC power to direct current (DC) power; blocking generation of an inrush current while the boosted AC power is being rectified; and controlling an operation of an LED by using the DC power supplied while the inrush current is being blocked.

Embodiments are also directed to a circuit apparatus includes a ballast for outputting supplied commercial alternating current (AC) power to AC power of a predetermined voltage so as to stabilize driving of the circuit apparatus; a boosting unit for boosting the AC power of the predetermined voltage output from the baliast; a rectifier for rectifying the boosted AC power to direct current (DC) power; an inrush current breaker for blocking generation of an inrush current while the boosted AC power is being rectified; and a driver for controlling an operation of the circuit apparatus by using the DC power supplied while the inrush current is being blocked.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present disclosure will be described more fully with reference to the accompanying drawings, in which exemplary embodiments of the invention are shown.

Figure 1:
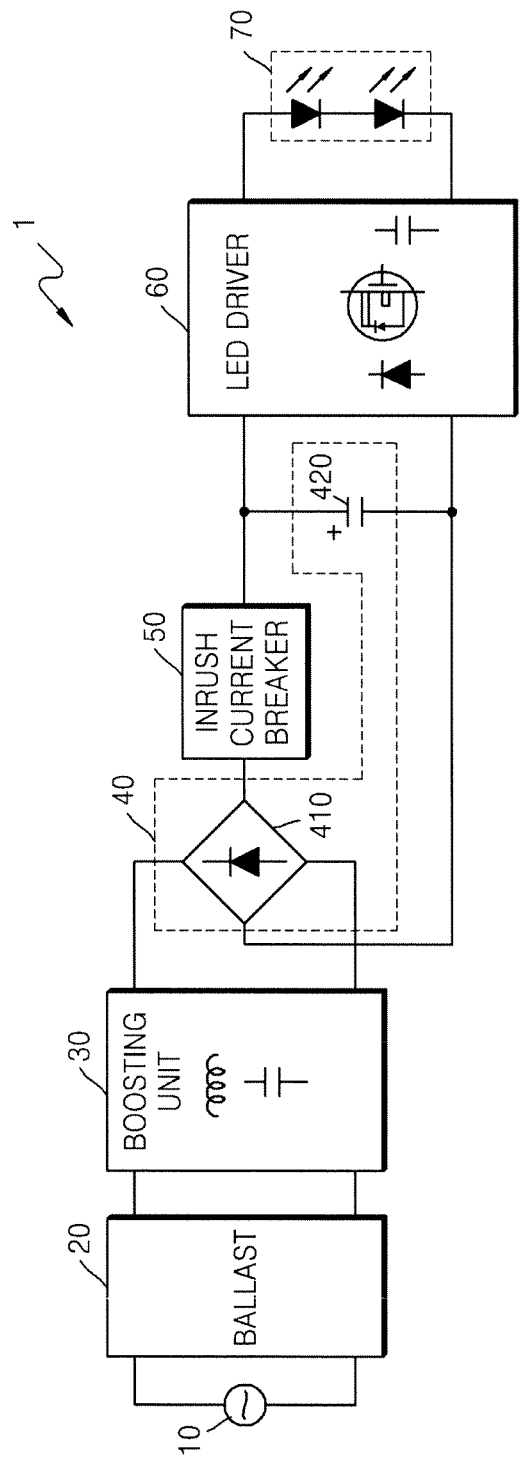
FIG. 1 is a circuit diagram of a light emitting diode (LED) lighting apparatus according to an embodiment of the present disclosure.

FIG. 1 is a circuit diagram of a light emitting diode (LED) lighting apparatus 1 according to an embodiment of the present disclosure. Referring to FIG. 1, the LED lighting apparatus 1 is an LED lamp, and includes a power supplier 10, a ballast 20, a boosting unit 30, a rectifier 40, an inrush current breaker 50, an LED driver 60, and a light source 70.

Only elements related to the current embodiment are shown in the LED lighting apparatus 1 of FIG. 1, and thus it would be appreciated by one of ordinary skill in the art that other general-purpose elements may be further included in the LED lighting apparatus 1 of FIG. 1.

The power supplier 10 applies commercial alternating current (AC) power to the LED lighting apparatus 1. The commercial AC power is general AC power provided to homes, companies, or the like, of which size and direction periodically change according to time. A standard local distribution voltage and a frequency of the commercial AC power are 200 V and 60 Hz, but the distribution voltage and the frequency are not limited thereto.

The LED lighting apparatus 1 according to the current embodiment uses an LED, as a lighting source, emitting a light by using such commercial AC power supplied through the power supplier 10.

In order to stabilize driving of the LED lighting apparatus 1, the ballast 20 outputs the commercial AC power of a predetermined voltage. For example, the ballast 20 may convert the commercial AC power of 220 V to AC power of 12 V so as to stabilize driving of the LED lighting apparatus 1.

The ballast 20 according to the current embodiment is an electrical or mechanical ballast that is commonly used, and thus a detailed circuit configuration, operations, etc. of the ballast 20 will be appreciated by one skilled in the art.

Here, the AC power output from the ballast 20 has a sine wave form having square waves, as will be described below with reference to FIG. 2.

Figure 2:
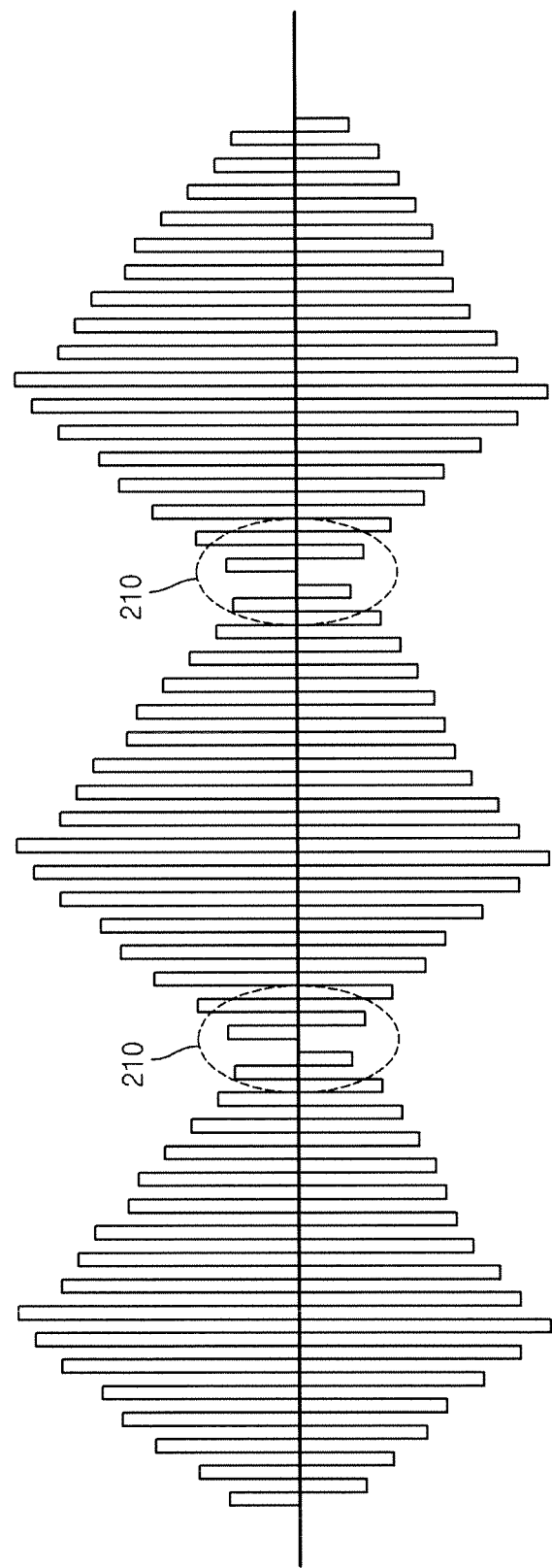
FIG. 2 is a diagram of alternating current (AC) power of a predetermined voltage output from a ballast, according to an embodiment of the present disclosure.

FIG. 2 is a diagram of the AC power of the predetermined voltage output from the ballast 20, according to an embodiment of the present disclosure. Referring to FIG. 2, as described above, the AC power output from the ballast 20 has a sine waveform including square waves.

Conventionally, a halogen lamp or an LED lamp includes a ballast between a commercial AC power supply and a halogen light source or an LED light source so as to use an AC power of 12 V having the sine waveform including square waves shown in FIG. 2. Here, since the conventional halogen lamp uses a filament of a resistance component, the halogen lamp is compatible with an output of the ballast 20.

On the other hand, the conventional LED lamp may include an LED driver for driving an LED. Since the LED driver mainly uses a switching method considering efficiency (heat radiation) and installability, the LED driver has a self-switching frequency. Also, since the LED driver may operate in a capacitive load or an inductive load due to elements of the LED driver, the LED driver may not be compatible with the ballast 20.

In addition, as described above, since the AC power output from the ballast 20 has the sine waveform including square waves, a voltage may drop near VF of the LED in a region 210 having a low voltage, and thus the LED may be turned off due to a reduction in current amount. In other words, quantity of light of the LED may decrease.

Accordingly, the LED lighting apparatus 1 according to the current embodiment includes the boosting unit 30 to be excellently compatible with the ballast 20 and to prevent quantity of light from decreasing.

Referring back to FIG. 1, the boosting unit 30 boosts and outputs the AC power of the predetermined voltage output from the ballast 20. Here, the boosting unit 30 boosts the AC power output from the ballast 20 by using a resonance phenomenon with a combination of an inductor and a capacitor.

The rectifier 40 rectifies the boosted AC power to direct current (DC) power. The rectifier 40 includes a bridge rectifier 410. Also, capacitance and a type of a capacitor 420 to be included in the rectifier 40 are determined based on the AC power boosted by the boosting unit 30. The rectifier 40 will be described in detail below.

Figure 3:
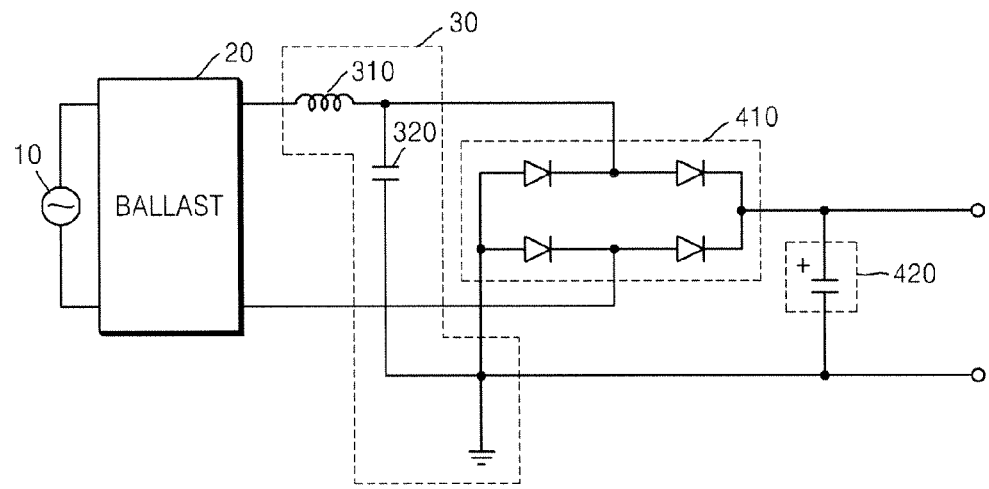
FIG. 3 is a diagram of a boosting unit according to an embodiment of the present disclosure.

FIG. 3 is a diagram of the boosting unit 30 according to an embodiment of the present disclosure. Referring to FIG. 3, the boosting unit 30 according to the current embodiment boosts the AC power by using a resonance phenomenon due to an inductor 310 and a capacitor 320 grounded with the ballast 20. However, a circuit configuration of the boosting unit 30 is not limited thereto, and may have another circuit configuration for boosting the AC power output from the ballast 20 by using the resonance phenomenon.

Figure 4A:
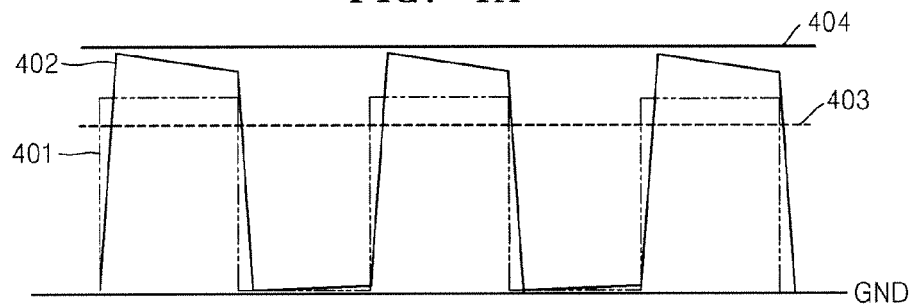
FIGS. 4A and 4B are diagrams for describing a boosting result of a boosting unit, according to an embodiment of the present disclosure.
Figure 4B:
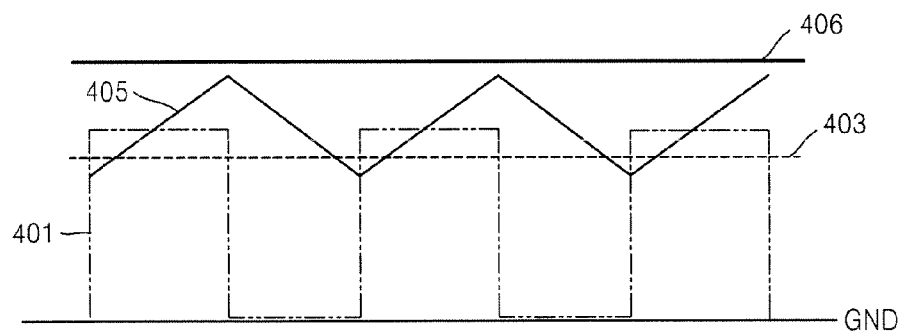

FIGS. 4A and 4B are diagrams for describing a boosting result of the boosting unit 30, according to an embodiment of the present disclosure.

First, FIG. 4A illustrates conventional square waves 401 without using the boosting unit 30, and square waves 402 outputted from the boosting unit 30.

Here, the square waves 402 having higher output voltages than the conventional square waves 401 may be obtained by using the boosting unit 30, as output voltages are pumped up by a resonance phenomenon of an LC circuit in the boosting unit 30.

The rectifier 40 rectifies the conventional square waves 401 or square waves 402 to output conventional DC power 403 or DC power 404. Here, the voltage of the rectified conventional DC power is lower than that of the rectified DC power 404 according to the current embodiment.

FIG. 4B is a diagram showing square waves when resonance of the LC circuit of the boosting unit 30 is sufficiently high compared to FIG. 4A.

FIG. 4B illustrates the conventional square waves 401 without using the boosting unit 30 and square waves 405 outputted from the boosting unit 30.

The square waves 405 have higher output voltages than those of the conventional square waves 401 as output voltages are pumped up by a resonant LC circuit in the booting unit 30 as shown in FIG. 4A. Here, unlike the square waves 402 of FIG. 4A, the square waves 405 may have a triangular type waveform when resonance of the LC circuit is sufficiently high. In other words, unlike the square waves 402 of FIG. 4A, the square waves 405 of FIG. 4B, when the resonance of the LC circuit is sufficiently high, may not have negative components to be rectified by the rectifier 40.

The rectifier 40 rectifies the conventional square waves 401 or the square waves 405 to the conventional DC power 403 or DC power 406. Here, the conventional DC power 403 has low voltages like FIG. 4A.

In conclusion, referring to FIGS. 4A and 4B, unlike a conventional LED lighting apparatus that does not include the boosting unit 30, the LED lighting apparatus 1 according to the current embodiment may remove the region 210 of FIG. 2 having a low voltage where a voltage drops near VF of the LED due to the boosting of the boosting unit 30. Accordingly, the current embodiment prevents decrease of the quantity of light of the LED due to a reduction in an amount of current caused by a drop in voltage near the VF of the LED.

Referring back to FIG. 1, the rectifier 40 includes the bridge rectifier 410 and the capacitor 420. Here, the capacitor 420 may be an electrolytic capacitor. However, a life of the electrolytic capacitor is limited due to its intrinsic characteristics. Accordingly, when the life of the electrolytic capacitor is ended, the lifespan of the LED lighting apparatus 1 may be limited. Since rectifying or smoothing of AC power to DC power by using the bridge rectifier 410 and the capacitor 420 is well known, details thereof are not described herein.

The capacitor 420 of the rectifier 40 may change the capacitance or the type of the capacitor 420 based on the AC power boosted by the boosting unit 30. In other words, the rectifier 40 may use the capacitor 420 having a low capacitance depending upon the boosting of the boosting unit 30.

For example, an electrolytic capacitor of 680 μF is used conventionally, but according to the current embodiment, the rectifier 40 may use an electrolytic capacitor of 470 μF due to the boosting of the boosting unit 30. Accordingly, the rectifier 40 according to the current embodiment may use a ceramic capacitor or a film capacitor having the same capacitance as the electrolytic capacitor, instead of the electrolytic capacitor. In other words, an electrolytic capacitor may not be used.

Accordingly, by replacing the electrolyte capacitor having a limited life with another type of capacitor based on the boosting of the boosting unit 30, the lifespan of the LED lighting apparatus 1 may extend or/and a more circuit space may be secured.

The inrush current breaker 50 blocks generation of an inrush current during the rectification. The inrush current breaker 50 blocks the inrush current by using the switch of the inrush current breaker 50, which is switched on and off by the charged amount of the capacitor of the inrush current breaker 50. Here, the switch may be realized by using a transistor, such as a field effect transistor (FET). The inrush current breaker 50 may be a discrete circuit between a rear end of the bridge rectifier 410 of the rectifier 40 and a front end of the LED driver 60.

As described above, the rectifier 40 may include the capacitor 420, such as an electrolytic capacitor, and at this time, an inrush current may be generated by an initial charge current of the electrolytic capacitor. Such an inrush current may damage the ballast 20, the LED driver 60, the light source 70, etc., of the LED lighting apparatus 1. Accordingly, the LED lighting apparatus 1 according to the current embodiment may prevent the damage caused by the inrush current by using the inrush current breaker 50.

Figure 5:
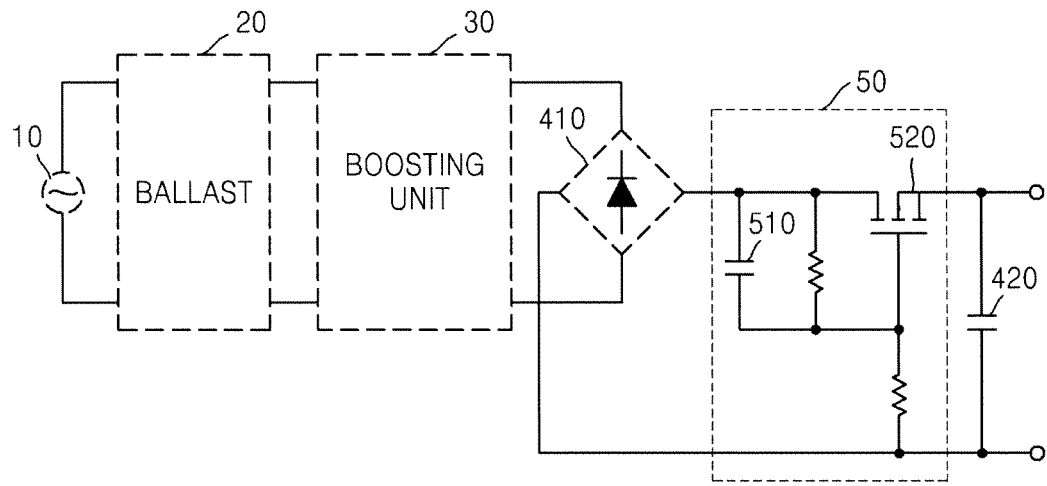
FIG. 5 is a diagram of an inrush current breaker according to an embodiment of the present disclosure.

FIG. 5 is a diagram of the inrush current breaker 50 according to an embodiment of the present disclosure. Referring to FIG. 5, the inrush current breaker 50 is disposed between the rear end of the bridge rectifier 410 and the front end of the LED driver 60.

As described above, the inrush current may be generated by the initial charge current of the capacitor 420 of the rectifier 40, such as an electrolytic capacitor. Since the LED lighting apparatus 1 consumes power that is about ⅕ or below that of a conventional halogen lamp, the ballast 20 or the like of the LED lighting apparatus 1 may be damaged if too much current is supplied.

In order to prevent such an inrush current, the inrush current breaker 50 blocks the inrush current by using a switch 520 that is switched on and off according to a charged amount of a capacitor 510.

In detail, the inrush current breaker 50 gradually turns on the switch 520 in proportion to a charge time or the charged amount of the capacitor 510 when the inrush current breaker 50 is activated every sine wave start period. This thereby limits the inrush current generated by the capacitor 420 of the rectifier 40 when activated. Also, when the LED lighting apparatus 1 is stably driven without the inrush current, the switch 520 of the inrush current breaker 50 is turned on and operated such that a circuit loss ($P_{loss} = I_{in}^2 \times R_{DS}$ on) of the LED lighting apparatus 1 is reduced.

Accordingly, the inrush current breaker 50 may block the inrush current without a circuit loss or heat radiation of the LED lighting apparatus 1.

Referring back to FIG. 1, the LED driver 60 controls the operations of the LED by using the DC power 404 of FIG. 4A or 406 of FIG. 4B supplied while the inrush current is being blocked.

The light source 70 includes at least one LED. In other words, the LED is driven and emits light according to control of the LED driver 60, and thus the LED lighting apparatus 1 performs functions as lighting or a lamp.

Since detailed circuit configurations and operations of the LED driver 60 and the light source 70 are well known, details thereof are not described herein.

As such, the LED lighting apparatus 1 according to the current embodiment boosts the output of the ballast 20 by using the boosting unit 30, thereby preventing deterioration of the quantity of light of the LED from the use of the ballast 20. Also, the LED lighting apparatus 1 according to the current embodiment boosts the output of the ballast 20 by using the boosting unit 30 to change the capacitance or type of the capacitor 420 of the rectifier 40, and thus the life of the LED lighting apparatus 1 may extend or a more internal circuit space may be secured. Furthermore, the LED lighting apparatus 1 blocks the inrush current by using the inrush current breaker 50, which prevents damages to a circuit, such as the ballast 20, the LED driver 60, the light source 70, etc. due to the inrush current.

In other words, difficulty in compatibility of a circuit configuration of a conventional halogen lamp or a conventional LED lamp may be revolved as the LED lighting apparatus 1 includes the boosting unit 30 or the inrush current breaker 50.

The LED lighting apparatus 1 of FIG. 1 described above includes both the boosting unit 30 and the inrush current breaker 50. However, the LED lighting apparatus 1 may include only one of the boosting unit 30 and the inrush current breaker 50.

In addition, at least one of the boosting unit 30 and the inrush current breaker 50 may be not only included in the LED lighting apparatus 1, but also in a general circuit apparatus having another load instead of the light source 70.

Figure 6:
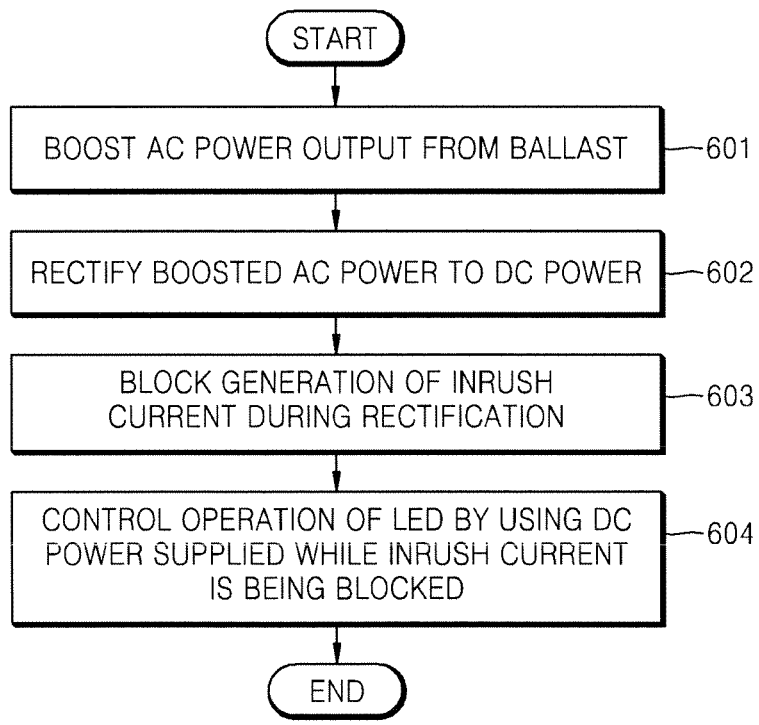
FIG. 6 is a flowchart illustrating a method of driving an LED lighting apparatus, according to an embodiment of the present disclosure.

FIG. 6 is a flowchart illustrating a method of driving the LED lighting apparatus 1 of FIG. 1, according to an embodiment of the present disclosure. Referring to FIG. 6, the method according to the current embodiment includes operations processed in series by the LED lighting apparatus 1 of FIG. 1. Thus, even if omitted, details described above with reference to the LED lighting apparatus 1 are applied to the method of FIG. 6.

In step 601, the boosting unit 30 boosts the AC power output from the ballast 20.

In step 602, the rectifier 40 rectifies the boosted AC power to DC power.

In step 603, the inrush current breaker 50 prevents generation of the inrush current during the rectification.

In step 604, the LED driver 60 controls the operation of the LED by using the DC power supplied while the inrush current is being blocked.

According to the embodiments of the present disclosure, an LED lighting apparatus includes a boosting circuit for boosting an output of a ballast, thereby preventing deterioration of a quantity of light of an LED due to use of the ballast. Also, capacitance of a capacitor of a rectifier circuit may be reduced or a type of the capacitor may be changed by supplying the output boosted in the boosting circuit, and thus a lifespan of the LED lighting apparatus may extend or a more internal circuit space may be secured. Furthermore, by blocking an inrush current by using an inrush current blocking circuit, damage to circuits, such as the ballast, an LED driver, and the LED, due to the inrush current may be prevented.

In other words, difficulty in a compatibility of a circuit of a conventional halogen lamp or LED lamp may be prevented.

While this invention has been particularly shown and described with reference to embodiments thereof, it will be appreciated by those of ordinary skill in the art that various changes in form and details may be made therein without departing from the spirit and scope of the invention as defined by the appended claims. The embodiments should be considered in a descriptive sense only and not for purposes of limitation. Therefore, the scope of the invention is defined not by the detailed description of the invention but by the appended claims, and all differences within the scope will be construed as being included in the present disclosure.

What is claimed is:

1. A light emitting diode (LED) lighting apparatus for driving an LED by supplying alternating current (AC) power through a ballast, the LED lighting apparatus comprising:
   a boosting unit for boosting and outputting the AC power output from the ballast;
   a rectifier for rectifying the boosted AC power to direct current (DC) power;
   an inrush current breaker for blocking generation of an inrush current while the rectifier rectifies the boosted AC power; and
   an LED driver for controlling operations of the LED by using the DC power supplied while the inrush current is being blocked,
   wherein the inrush current breaker is electrically connected between the rectifier and the LED driver, and
   wherein the inrush current breaker blocks the inrush current by using a switch of the inrush current breaker, which is switched on and off according to an amount of charge in a capacitor of the inrush current breaker.

2. The LED lighting apparatus of claim 1, wherein the boosting unit includes an inductor and a capacitor coupled to the ballast, of which resonance enables the boosted AC power having a triangular waveform to be outputted.

3. The LED lighting apparatus of claim 1, wherein capacitance and a type of a capacitor of the rectifier are determined based on the boosted AC power.

4. The LED lighting apparatus of claim 1, wherein the inrush current breaker is a discrete circuit between a rear end of a bridge rectifier of the rectifier and a front end of the LED driver.

5. A light emitting diode (LED) lighting apparatus for driving an LED by supplying alternating current (AC) power through a ballast, the LED lighting apparatus comprising:
   a rectifier for rectifying the AC power supplied through the ballast to direct current (DC) power;
   an inrush current breaker for blocking generation of an inrush current while the AC power is rectified; and
   an LED driver for controlling an operation of the LED by using the DC power supplied while the inrush current is blocked,
   wherein the inrush current breaker is electrically connected between the rectifier and the LED driver, and
   wherein the inrush current breaker blocks the inrush current by using a switch of the inrush current breaker, which is switched on and off according to a charged amount of a capacitor of the inrush current breaker.

6. The LED lighting apparatus of claim 5, wherein the inrush current breaker is a discrete circuit between a rear end of a bridge rectifier of the rectifier and a front end of the LED driver.

* * * * *